United States Patent
Leclercq et al.

(10) Patent No.: US 7,665,331 B2
(45) Date of Patent: Feb. 23, 2010

(54) METHOD AND MACHINE FOR THE PRODUCTION OF CONVEX GLASS SHEETS

(75) Inventors: Jacques Leclercq, Roisel (FR); Gilles Garnier, Dompierre (FR)

(73) Assignee: Saint-Gobain Glass France, Courbevoie (FR)

( * ) Notice: Subject to any disclaimer, the term of this patent is extended or adjusted under 35 U.S.C. 154(b) by 198 days.

(21) Appl. No.: 10/578,779

(22) PCT Filed: Nov. 5, 2004

(86) PCT No.: PCT/FR2004/050568

§ 371 (c)(1),
(2), (4) Date: May 9, 2006

(87) PCT Pub. No.: WO2005/047198

PCT Pub. Date: May 26, 2005

(65) Prior Publication Data

US 2007/0084245 A1  Apr. 19, 2007

(30) Foreign Application Priority Data

Nov. 12, 2003  (FR)  ................................. 03 50827

(51) Int. Cl.
C03B 23/023 (2006.01)
C03B 23/00 (2006.01)
C03B 23/02 (2006.01)
C03B 27/00 (2006.01)
C03B 27/04 (2006.01)

(52) U.S. Cl. .............................. 65/106; 65/104; 65/286; 65/287; 65/351

(58) Field of Classification Search .................. 65/104, 65/106–109, 286

See application file for complete search history.

(56) References Cited

U.S. PATENT DOCUMENTS 3,329,493 A * 7/1967 McMaster .................... 65/287

(Continued)

FOREIGN PATENT DOCUMENTS

EP  0 133 114  2/1985

(Continued)

OTHER PUBLICATIONS

U.S. Appl. No. 10/550,736, filed Sep. 26, 2005, Thellier, et al.

*Primary Examiner*—Steven P Griffin
*Assistant Examiner*—Cynthia Szewczyk
(74) *Attorney, Agent, or Firm*—Oblon, Spivak, McClelland, Maier & Neustadt, L.L.P.

(57) ABSTRACT

A method and machine for obtaining bent glass sheets. Glass sheets are brought to their softening temperature, then they are caused to travel over a shaping bed of advancing elements for advancing them which are arranged along a path having a circular arc-shaped profile, the sheets progressively assuming their shape on entering the bed and over a first shaping zone, then being hardened by tempering or cooling in a second zone of the bed until they leave, and then the bent glass sheets thus obtained are recovered. The shaping bed is produced with a profile extending in a circular arc of more than 90°, and, on leaving the shaping bed, the hardened glass sheets are moved in a direction opposite that in which they were fed in.

22 Claims, 4 Drawing Sheets

U.S. PATENT DOCUMENTS

| | | | |
|---|---|---|---|
| 3,409,422 A * | 11/1968 | Gulotta | 65/25.4 |
| 3,973,673 A | 8/1976 | Ahluwalia | |
| 4,123,246 A * | 10/1978 | Johnson | 65/104 |
| 4,139,359 A * | 2/1979 | Johnson et al. | 65/107 |
| 4,292,065 A | 9/1981 | Nedelec et al. | |
| 4,976,762 A * | 12/1990 | Anttonen | 65/107 |
| 5,735,922 A | 4/1998 | Woodward et al. | |
| 6,598,427 B1 * | 7/2003 | Douche et al. | 65/118 |
| 2003/0154745 A1 | 8/2003 | Garnier et al. | |
| 2006/0010916 A1 | 1/2006 | Leclercq et al. | |

FOREIGN PATENT DOCUMENTS

| | | |
|---|---|---|
| EP | 0 298 426 | 1/1989 |
| EP | 0 346 198 | 12/1989 |
| EP | 0 593 363 | 4/1994 |
| EP | 593363 A1 * | 4/1994 |

\* cited by examiner

METHOD AND MACHINE FOR THE PRODUCTION OF CONVEX GLASS SHEETS

The present invention relates to techniques for obtaining bent glass sheets.

More specifically, the invention relates to those of these techniques in which the glass sheets are made to travel over at least one shaping bed consisting of shaping rods, for example rotating elements arranged along a path having a curved profile in the direction of travel of the glass sheets.

The invention applies for example to the production of automotive glazing, for example of the side window type.

Such bending techniques are currently employed at very high production rates due, in particular, to the possibility of moving the glass sheets along with a spacing of just a few centimeters between them. They allow very good repeatability of the curvature and of the optical quality of the end glazing.

Bending methods and machines are described for example in EP-133 113, EP-133 114 and in international application PCT WO 99/12855. In a known way, the glass sheets are brought to their softening temperature and then they travel in an ascending manner through a shaping bed which has a quarter-circle profile or a profile which is less than a quarter of a circle, in which shaping bed they enter horizontally into a tangential manner and which imparts the desired curvature to the glass sheets.

Once the sheets have been shaped, they are tempered or cooled in order to be hardened, and then a tilting device makes it possible to replace them horizontally, on leaving the shaping bed, on a conveyor carrying them toward a second cooling zone and then toward the exit zone.

This bending method has various disadvantages.

The first is that, because of the limited length of the shaping bed, it is necessary to find a compromise between productivity in respect of which the speed of movement through the shaping bed is increased, and the properties of the glass, in particular the optical properties of the glass, in respect of which it is necessary to increase the time it takes to pass through the shaping bed, whether for shaping the glass sheet or for hardening it, in particular the tempering operation.

The second is that the tilting device situated at the exit from the shaping bed must be regulated precisely on each occasion that the thickness of the glass sheets is modified, since the last two roller/backing roller pairs of the bed need to pinch the rear end of a glass sheet which is in a vertical position in order to tilt it with the aid of a mechanical system onto the conveyor until it is in a horizontal position. Such pinching may mark the glass sheet. Furthermore, the pinching rollers may develop mechanical problems and problems of wear. Such a pinching device is described in EP 346198.

The present invention provides a solution to these various problems. To this end, the inventors have envisioned prolonging the shaping bed and provided means so that the glass sheets are arranged on the conveyor in the direction of the exit zone without being pinched.

Thus, to solve the two main disadvantages of the prior art method, the shaping bed has been prolonged along the initial arc until extending over a circular arc of more than 90°, allowing hardened sheets to return in the opposite direction to that in which they arrived.

On leaving the shaping bed, the glass sheet is no longer pinched but it tilts or drops directly into a position in which it can be conveyed by the conveyor in the direction of the exit zone.

Furthermore, on leaving the shaping bed, the glass sheet is moved in a direction opposite that of the conveyor by which it entered. This arrangement thus also allows savings in ground space to be made.

The invention offers the additional advantage of making it possible to modify an existing installation which might have a shaping profile extending over an arc of less than 90°, by envisioning prolonging the latter following the initial curvature.

The subject of the present invention is therefore firstly a method of manufacturing bent glass sheets, in which glass sheets are brought to their softening temperature, then they are caused to travel over a shaping bed consisting of elements for advancing them which are arranged along a path having a circular arc-shaped profile, the sheets being bent in their direction of advance over the bed according to the radius of curvature of the bed and also being able to be bent in the direction transverse to the preceding direction depending on the shape chosen for the advancing elements, the sheets progressively assuming their shape on entering the shaping bed and over a first zone, termed shaping zone, then being hardened by tempering or cooling in a second zone of the shaping bed until they leave, and then the bent glass sheets thus obtained are recovered, characterized in that a shaping bed is produced with a profile extending in a circular arc of more than 90°, and in that, on leaving the shaping bed, the hardened glass sheets are moved in a direction opposite that in which they were fed in.

Preferably, the glass sheets are brought horizontally to the shaping bed, and they are also conveyed horizontally on leaving the shaping bed.

According to a first variant, the glass sheets are caused to travel along a flat trajectory in a heating furnace so as to bring them to the softening temperature, then along the curved trajectory of the shaping bed, tangential to the aforementioned flat trajectory.

According to a second variant, a prior bending operation is carried out by sagging the glass sheets brought to their softening temperature before causing them to travel over the shaping bed.

According to a first embodiment of the method according to the present invention, the glass sheets are caused to travel over the shaping bed along an ascending path, backing rollers being associated with the forwarding elements of the shaping bed in every zone thereof in which the sheets need to be retained, and each hardened glass sheet is overturned on release from the last roller/backing roller pair associated with the shaping bed, the sheets thus overturned being received by a conveyor belt and then taken over by a roller conveyor with the aim of transferring them toward the exit point.

It is thus possible to overturn a hardened glass sheet by causing it, on its release, to be projected under the effect of its speed so that it strikes, by way of its front lower end edge, against the upper part of an idle roller whose axis is parallel to that of the forwarding elements of the shaping bed, the hardened glass sheet then tilting about this line of contact with the idle roller under the effect of its weight so that it drops onto the reception conveyor belt in the overturned state.

It is also possible to overturn a hardened glass sheet by causing it, on its release, to be projected under the effect of its speed so that is applied, by way of its lower face, to a roller, preferably an idle roller, whose axis is parallel to that of the forwarding elements of the shaping bed, by blowing air under the sheet in the region situated upstream of its line of contact with said roller, in order to tilt said hardened glass sheet about said roller so that it drops down onto the reception conveyor belt in the overturned state.

According to a second embodiment of the method according to the present invention, the glass sheets are caused to travel over the shaping bed along a descending path, backing rollers being associated with the forwarding elements of the shaping bed in every zone thereof in which the sheets need to be retained, and the hardened glass sheets are recovered on leaving the shaping bed by being simply deposited on a conveyor belt and then taken over on a roller conveyor or by being directly deposited on a roller conveyor with the aim of transferring them toward the exit point.

In the first aforementioned embodiment and, if appropriate, in the second aforementioned embodiment, perforated or multi-strap conveyor belts are advantageously used so as to allow cooling by blowing in air from underneath onto the lower face of the transported glass sheets.

It is possible to choose the advancing elements of the shaping bed from among rods having an axis of symmetry, such as cylindrical, conical and waisted/barreled rods, and rotating on themselves, and cambered or curved elements which are surrounded by rotating tubular sleeves, the shapes of said advancing elements being able to change along the shaping zone of the shaping bed.

All these types of advancing elements of the shaping bed have been described in the patent literature. There may thus be mentioned European patents EP-143 691 and EP-148 043 describing curved rollers in handlebar form, EP-413 619 describing cambered elements, EP-415 826 describing waited/barreled rollers, and EP-474 531 describing conical rollers.

The bending operation is advantageously carried out with a radius of curvature of the shaping bed, that is to say of a line parallel to the direction of travel, of 1 to 2 meters, and a radius of curvature of a line perpendicular to the direction of travel of 5 meters to infinity.

Advantageously, glass sheets which have assumed their shape at a temperature of 600 to 700° C. are caused to travel.

In order to harden the bent glass sheets, they are subjected to tempering in the tempering zone of the shaping bed by exposing them to air at a pressure of $0.98 \times 10^4$ Pa to $2.94 \times 10^4$ Pa (1000 to 3000 mm water column).

According to a possibility as described in French patent application 02 12577 in the name of the Applicant company filed on 10 Oct. 2002, air is blown in continuously over at least one face of the glass sheets having begun to be shaped and before they enter the cooling or tempering zone, under conditions capable of asymmetrically influencing the final concavity of the bent glass sheets by comparison with the concavity that the final bending would have given without said blowing.

The method according to the invention makes it possible to carry out the bending operation on glass sheets having a thickness in particular of 1 to 6 mm.

It is possible to adjust the distance between the glass sheets on the shaping bed to a value of 2 to 20 cm.

It is possible to obtain hardened bent glass sheets at a rate of at least one sheet every four seconds, in particular of one sheet per second.

Another subject of the present invention is a machine for bending glass sheets comprising means for causing glass sheets which have been brought to their softening temperature beforehand to travel over a shaping bed consisting of elements for advancing them which are arranged along a path having a circular arc-shaped profile, characterized in that the shaping bed extends over a circular arc of more than 90°, and in that means are provided for taking over the bent glass sheets, on leaving said shaping bed, in a direction opposite that in which they were fed in.

In the case that the path of travel of the glass sheets is designed to be ascending, the means for taking over the glass sheets comprise means for overturning the latter before they are recovered on a conveyor belt.

According to a first variant, the overturning means consist of an idle roller whose axis is parallel to that of the forwarding elements of the shaping bed, arranged at a height such that the glass sheets ejected from the shaping bed strike, by way of their front lower end edge, against the upper part of said roller.

According to a second variant, the overturning means consist of a roller, preferably an idle roller, whose axis is parallel to that of the forwarding elements of the shaping bed, arranged at a height such that the glass sheets ejected from the shaping bed are applied to said roller by way of their lower face, means being provided, such as air-blowing means, to tilt the hardened glass sheet about said roller.

In the case that the path of travel of the glass sheets is designed to be descending, the means for taking over the glass sheets consist of recovery means in the form of a conveyor belt or roller conveyor.

The conveyor belts are advantageously perforated or multi-strap conveyor belts.

The advancing elements of the shaping bed may be of any type, examples being mentioned above.

Backing rollers are advantageously associated with the advancing elements of the shaping bed in every zone thereof in which there is a requirement to retain the glass sheets.

Moreover, the machine according to the invention advantageously comprises means for tempering or cooling the glass sheets once they have been shapmed, said means consisting particularly of tempering blow-boxes each comprising nozzles arranged in arrays and directed between two adjacent forwarding elements of the shaping bed.

Such blow-boxes are described in international application WO 99/12855.

The machine according to the invention may additionally comprise at least one nozzle for continuously blowing in air, arranged at a point on the line of travel of the sheets after the sheets have begun to be shaped and before they enter the cooling or tempering zone, the nozzle or nozzles being arranged so that air is blown asymmetrically onto said sheets and adjusted so that the blowing of air influences the final concavity of the bent glass sheets by comparison with the concavity that the final bending would have given without said blowing.

The present invention relates finally to bent glass sheets obtained or capable of being obtained by the method as defined above.

BRIEF DESCRIPTION OF THE DRAWINGS

In order to better illustrate the method and the machine according to the present invention, a number of specific embodiments thereof will now be described by way of non-limiting illustration with reference to the appended drawing, in which:

FIG. 1 represents the route taken by a glass sheet through an installation for bending it according to the prior art.

Figure 1:
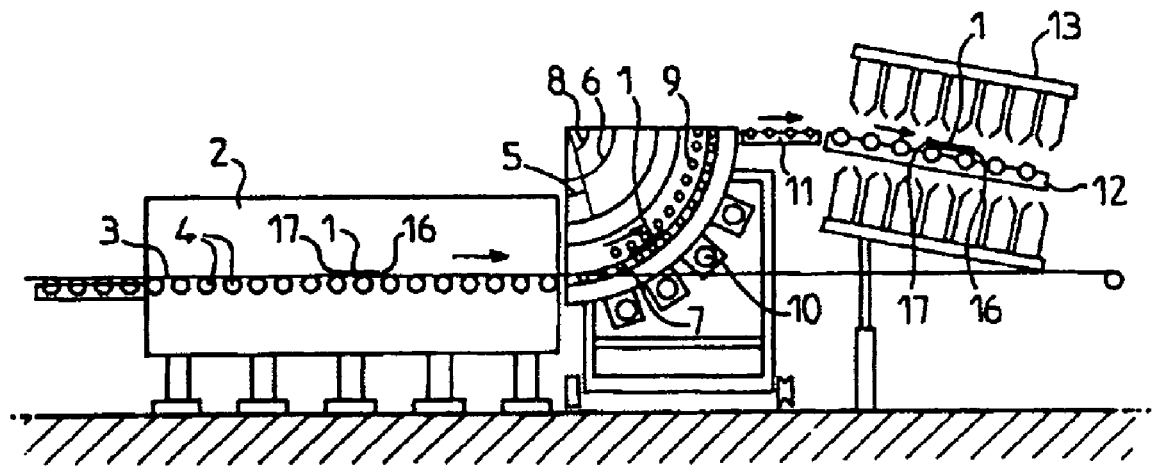
FIG. 1 is a schematic representation in side view of a prior art bending/tempering machine in which a glass sheet travels through a heating furnace, then through an ascending shaping bed, and then, on leaving, through a secondary cooling zone.

The glass sheet 1 passes first of all through a heating zone 2, in which it is carried on a horizontal conveyor 3 consisting of a series of drive rollers 4. On leaving the heating zone 2, the temperature of the glass sheet 1 is greater than or equal to its bending temperature.

The glass sheet 1 then enters the shaping zone 5 of the shaping bed 6 in which rollers 7 are mounted longitudinally in a circular arc-shaped profile. The rollers 7 thus form an ascending shaping bed which conveys the glass sheet 1 in the same direction as the conveyor 3. In the shaping zone 5, the glass sheets 1 acquire a curvature according to the radius of curvature of the shaping bed that is obtained through the action of gravity, optionally of upper backing rollers, of their speed or else of a combination of these factors.

The shaping zone 5 is followed by a tempering or cooling zone 8 in which the glass sheets 1 are caused to harden. The rollers 7 are arranged therein in the same circular arc-shaped profile. Backing rollers 9 are provided to retain the glass sheets 1. The tempering or cooling devices consist of blow-boxes 10 arranged on either side of the rollers 7 and backing rollers 9, thus acting on both faces of the glass sheet 1 so that, as they pass between the boxes 10 and depending on the blowing pressure chosen, the bent glass sheet 1, depending on its thickness, is either tempered or simply hardened in the bent position.

On exiting the shaping bed 6, the bent glass sheet 1 is pinched by the last two pairs of rollers 7 and backing rollers 9 and tilts onto a conveyor 11 which transports the glass sheets in the same direction as the conveyor 3 of the heating zone 2.

The glass sheet 1 is then discharged by a flat conveyor 12 which passes through a secondary cooling zone 13.

Figure 2:
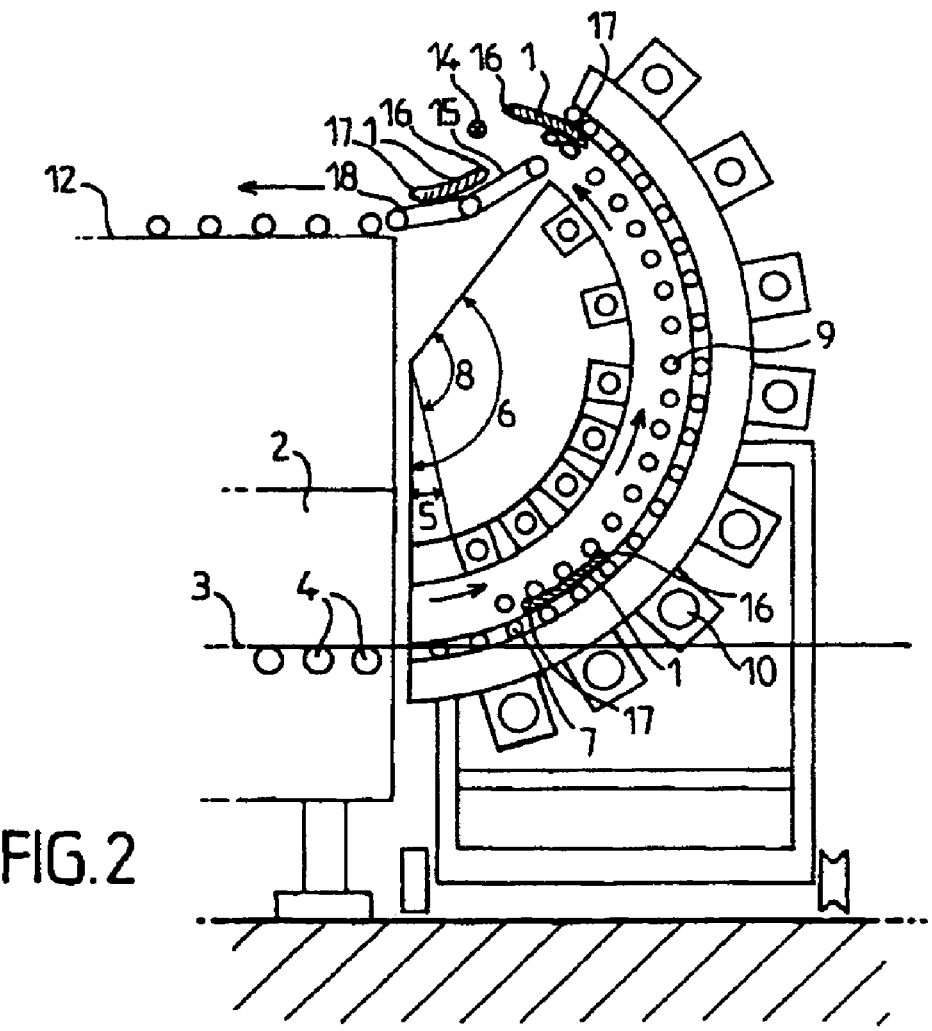
FIG. 2 is a schematic representation in side view of a bending/tempering machine according to a first embodiment of the invention, in which a glass sheet passes through an ascending shaping bed.

FIG. 2 represents the route taken by a glass sheet through an installation for the bending operation according to a first embodiment of the present invention.

The glass sheet 1 exiting the heating zone 2 enters the shaping zone 5 and then the tempering or cooling zone 8. The shaping bed 6 forms a circular arc of more than 90° thus allowing a larger shaping zone 5, and consequently better optical properties of the glass, and/or a greater cooling or tempering zone 8, resulting in correct tempering of the glass sheet 1.

On leaving the tempering zone 8, the hardened glass sheet is overturned by striking against the idle roller 14 whose axis is parallel to the rollers 7 and backing rollers 9 and tilting about said roller 14 so as to drop onto the reception conveyor belt 15.

The distance between the point of contact of the sheet on the roller 14 and the center of the circle of the shaping bed is therefore less than, or at the very most equal to, the distance between the point of contact of the glass sheet on a backing roller 9 and the aforementioned center of the circle.

The glass sheet 1 is then conveyed by the conveyor 12, which transports it in the opposite direction to that of the conveyor 3 and on which the glass sheet 1 continues to be cooled.

FIG. 3 to 7 represent the various steps of the tilting of the glass sheet 1 according to the embodiment of the invention represented in FIG. 2.

Figure 3:
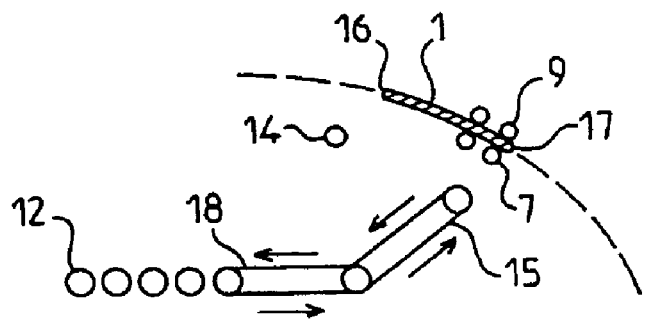
FIGS. 3 to 7 are schematic representations of the trajectory of the bent glass sheet on leaving the ascending shaping bed according to a first variant of this first embodiment of the invention.

The glass sheet 1 leaving the shaping bed is retained by the last two pairs of rollers 7 and backing rollers 9 while remaining within the prolongation of the shaping bed 6 (FIG. 3).

Figure 4:
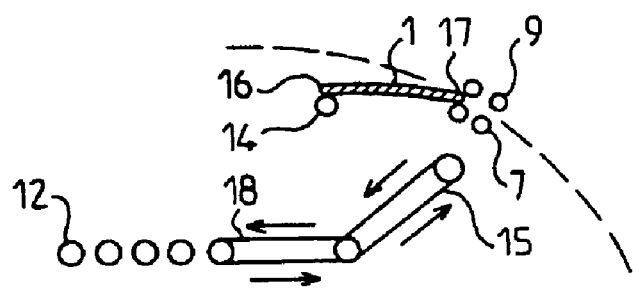

Next, the glass sheet 1 is projected under the effect of its speed, and the lower edge of its front end 16 strikes against the upper part of the roller 14 (FIG. 4).

Figure 5:
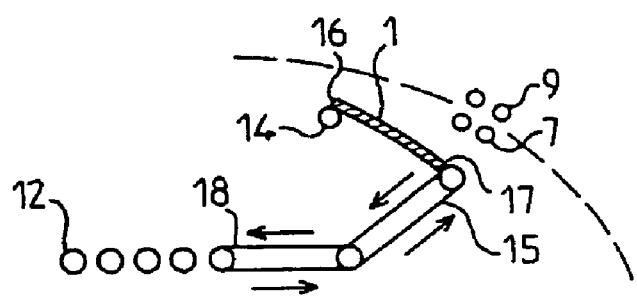
Figure 6:
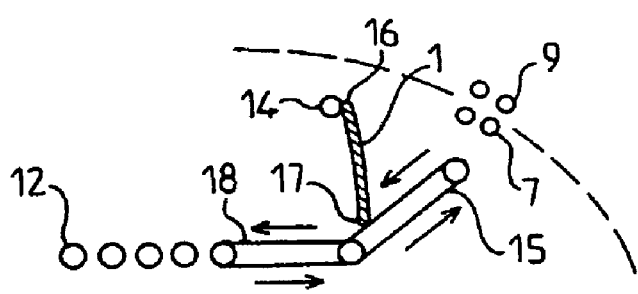

The rear end 17 of the glass sheet 1 drops under the effect of its weight onto the conveyor belt 15, which causes it to pass below the roller 14 (FIGS. 5 and 6).

Figure 7:
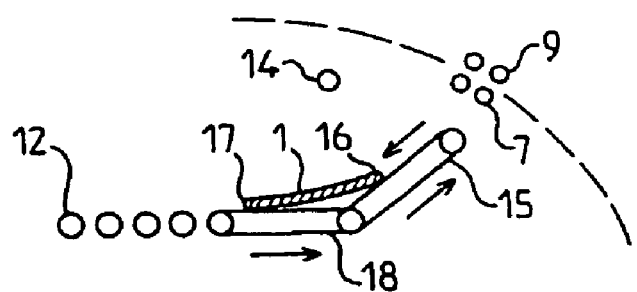

When the rear end 17 passes below the front end 16, the glass sheet 1 tilts and drops in the overturned state so as to be conveyed by the reception conveyor belt 15, then by a take-over conveyor belt 18 toward the conveyor 12 (FIG. 7). The rear end 17 is then situated at the front of the sheet 1 on the conveyor 12.

According to another variant, the glass sheet 1 leaving the ascending shaping bed is caused to tilt about the roller 14a as is represented in FIGS. 8 to 11.

Figure 8:
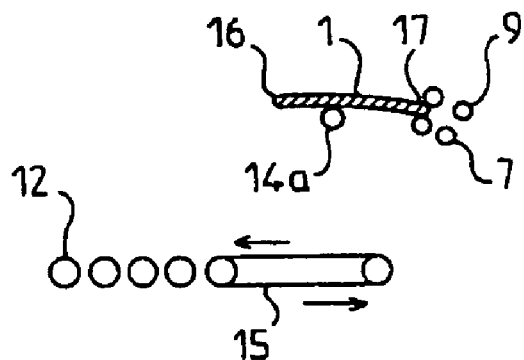
FIGS. 8 to 11 are schematic representations of the trajectory of the bent glass sheet on leaving the ascending shaping bed according to a second variant of this first embodiment.

On leaving the last rollers 7 and backing rollers 9, the glass sheet is projected under the effect of its speed and drops onto the roller 14a (FIG. 8).

Figure 9:
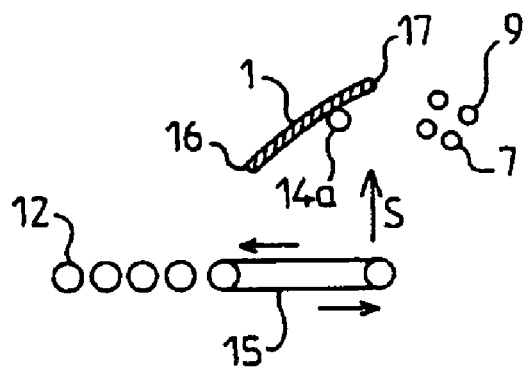
Figure 10:
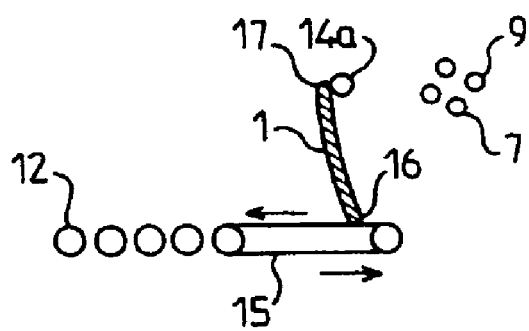
Figure 11:
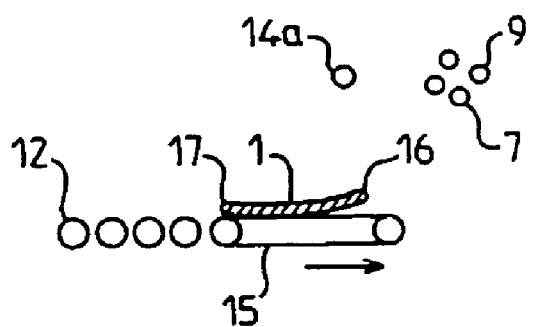

As a result of a blower exerting an upward blow S on the sheet 1 in the region situated upstream of its line of contact with the roller 14a, the rear end 17 is raised while the front end 16 drops down and causes the glass sheet 1 to tilt about the roller 14a (FIG. 9). When the front end 16 passes beneath the rear end 17 (FIG. 10), the glass sheet 1 drops in the overturned state onto the conveyor belt 15 and is driven onto the conveyor 12.

The front end 16 is then situated at the rear of the sheet 1 on the conveyor 12.

Figure 12:
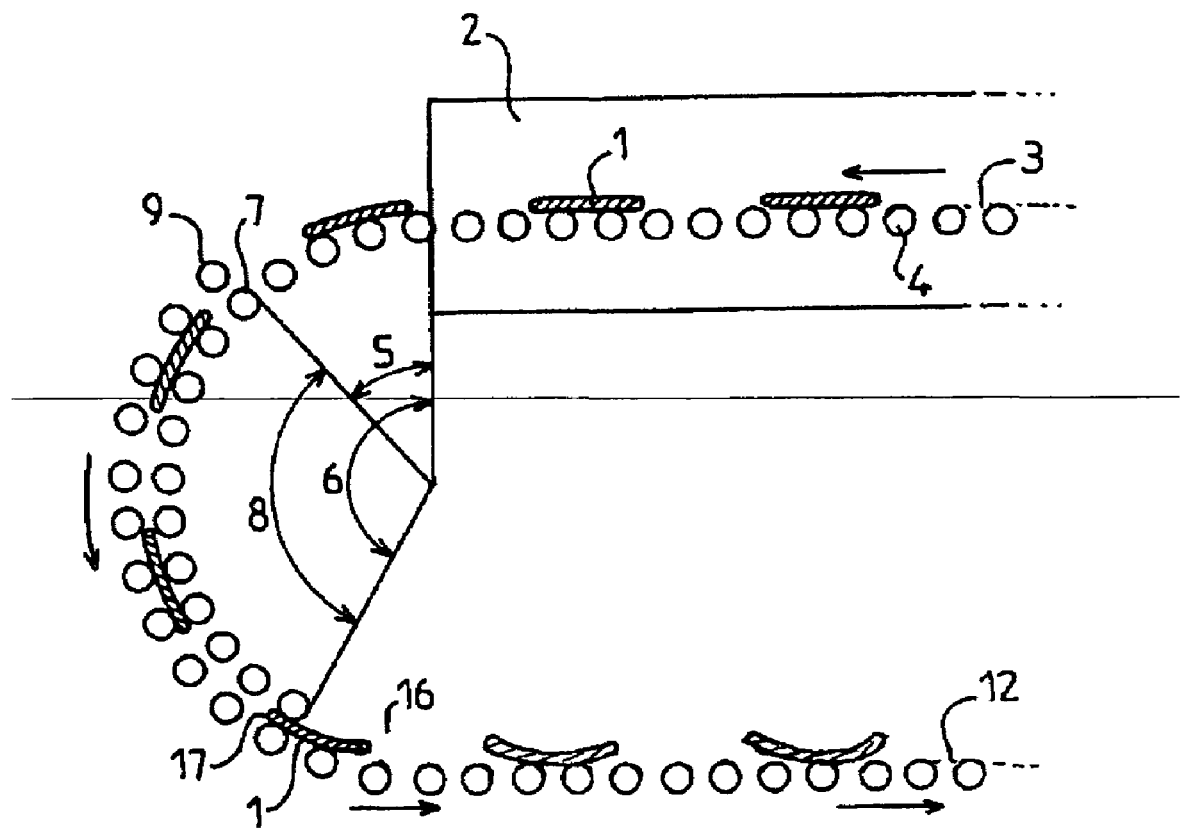
FIG. 12 is a schematic representation in side view of a bending/tempering machine according to a second embodiment of the invention, in which a glass sheet travels through a descending shaping bed.

FIG. 12 schematically represents the route taken by a glass sheet 1 through a bending machine whose shaping bed has a descending circular profile.

It can be seen from this figure that the glass sheet 1 leaving the shaping bed 6 gets directly positioned on the conveyor 12, which transports it in an opposite direction to that of the conveyor 3 situated at the entrance to the shaping bed.

In the same way as for the bending machine according to the invention having an ascending shaping bed, the descending shaping bed is developed over a circular arc of more than 90°, thus allowing a greater shaping zone 5, resulting in better optical properties, and/or a greater tempering zone 8, so that tempering can be carried out correctly, without damaging the glass sheet as a result of pinching.

The invention claimed is:

1. A method of manufacturing bent glass sheets, comprising:

bringing glass sheets to their softening temperature, then moving the glass sheets over a shaping bed of advancing elements for advancing the glass sheets which are arranged along a path having a circular arc-shaped profile;

bending the glass sheets in a first direction of advance over the bed according to the radius of curvature of the bed, the glass sheets progressively assuming their shape on entering the shaping bed and over a first shaping zone; and hardening the glass sheets by tempering or cooling in a second zone of the shaping bed until the glass sheets leave the shaping bed, and then the bent glass sheets thus obtained are recovered, wherein the shaping bed has a profile extending in a circular arc of more than 90°, a plurality of blow-boxes are disposed along at least a portion of the circular arc, and the portion extends over more than 90° of the circular arc, and wherein, upon leaving the shaping bed, the hardened glass sheets are moved in a direction opposite that in which they were fed into the bed.

2. The method as claimed in claim 1, wherein the glass sheets are brought horizontally to the shaping bed, and are also conveyed horizontally on leaving the shaping bed.

3. The method as claimed in claim 1, wherein the glass sheets are caused to travel along a flat trajectory in a heating furnace so as to bring the glass sheets to the softening temperature, then along the curved trajectory of the shaping bed, tangential to the flat trajectory.

4. The method as claimed in claim 1, wherein a prior bending operation is carried out by sagging the glass sheets brought to their softening temperature before causing them to travel over the shaping bed.

5. The method as claimed in claim 1, wherein the glass sheets are caused to travel over the shaping bed along an ascending path, backing rollers being associated with the advancing elements of the shaping bed in every zone thereof in which the glass sheets need to be retained, and wherein each hardened glass sheet is overturned on release from the last roller/backing roller pair associated with the shaping bed, the glass sheets thus overturned being received by a conveyor belt and then taken over by a roller conveyor to be transferred toward an exit point.

6. The method as claimed in claim 5, wherein a hardened glass sheet is overturned by causing it, on its release, to be projected under the effect of its speed so that it strikes, by way of its front lower end edge, against an upper part of an idle roller whose axis is parallel to that of the advancing elements of the shaping bed, the hardened glass sheet then tilting about a line of contact with the idle roller under the effect of its weight to drop onto the conveyor belt in the overturned state.

7. The method as claimed in claim 5, wherein a hardened glass sheet is overturned by causing it, on its release, to be projected under the effect of its speed so that it is applied, by way of its lower face, to a roller whose axis is parallel to that of the advancing elements of the shaping bed, by blowing air under the sheet in a region situated upstream of its line of contact with the roller to tilt the hardened glass sheet about the roller to drop down onto the conveyor belt in the overturned state.

8. The method as claimed in claim 5, wherein perforated or multi-strap conveyor belts are used to cool the glass sheets via blowing in air from underneath onto the lower face of the transported glass sheets.

9. The method as claimed in claim 5 wherein each hardened glass sheet is overturned, relative to a position occupied by the hardened glass sheet as it contacts a last of the backing rollers, upon release from a last roller/backing roller pair associated with the shaping bed.

10. The method as claimed in claim 9, wherein the overturning is performed via an idle roller whose axis is parallel to that of the advancing elements of the shaping bed, the idle roller arranged at a height such that the hardened glass sheets ejected from the shaping bed strike, by way of their front lower end edge, against an upper part of the idle roller.

11. The method as claimed in claim 9, wherein the overturning is performed via a roller whose axis is parallel to that of the advancing elements of the shaping bed, arranged at a height such that the hardened glass sheets ejected from the shaping bed are applied to the roller by way of their lower face, wherein the overturning includes tilting the hardened glass sheet about the roller.

12. The method as claimed in claim 1, wherein the glass sheets are caused to travel over the shaping bed along a descending path, backing rollers being associated with the advancing elements of the shaping bed in every zone thereof in which the sheets need to be retained, and wherein the hardened glass sheets are recovered upon leaving the shaping bed by being deposited on a conveyor belt and then moved on a roller conveyor or by being directly deposited on a roller conveyor transferred toward an exit point.

13. The method as claimed in claim 1, wherein the advancing elements of the shaping bed include at least one of rods having an axis of symmetry, including cylindrical, conical and waisted/barreled rods, and rotating on themselves, or cambered or curved elements that are surrounded by rotating tubular sleeves, shapes of the advancing elements configured to change along the shaping zone of the shaping bed.

14. The method as claimed in claim 1, wherein the bending is performed with a shaping bed with a radius of curvature of a line parallel to the direction of travel of 1 to 2 meters, and a radius of curvature of a line perpendicular to the direction of travel of 5 meters to infinity.

15. The method according to claim 1, wherein the glass sheets which have assumed their shape at a temperature of 600 to 700° C. are caused to travel.

16. The method as claimed in claim 1, wherein the glass sheets are subjected to tempering in the tempering zone of the shaping bed by exposing the glass sheets to air at a pressure of $0.98 \times 10^4$ Pa to $2.94 \times 10^4$ Pa (1000 to 3000 mm water column).

17. The method as claimed in claim 1, wherein air is blown continuously over at least one face of the glass sheets having begun to be shaped and before the glass sheets enter the cooling or tempering zone, under conditions that asymmetrically influence a final concavity of the bent glass sheets by comparison with a concavity that the final bending would have given without the blowing.

18. The method as claimed in claim 1, wherein the bending operation is carried out on glass sheets having a thickness of 1 to 6 mm.

19. The method as claimed in claim 1, wherein the distance between the glass sheets on the shaping bed is adjusted to a value of 2 to 20 cm.

20. The method as claimed in claim 1, wherein the hardened bent glass sheets are obtained at a rate of at least one sheet every four seconds.

21. Bent glass sheets obtained by the method as defined in claim 1.

22. The method as claimed in claim 1 further comprising bending the glass sheets in a direction transverse to the first direction.

* * * * *